(12) United States Patent
Wieczorek et al.

(10) Patent No.: US 12,046,091 B2
(45) Date of Patent: Jul. 23, 2024

(54) ELECTRONIC HANDHELD DEVICE, IN PARTICULAR RADIO KEY, WITH A SEALING HOOD

(71) Applicant: HUF HÜLSBECK & FÜRST GMBH & CO. KG, Velbert (DE)

(72) Inventors: Roland Wieczorek, Velbert (DE); Rob Schroeter, Duesseldorf (DE)

(73) Assignee: Hug Huelsbeck & Fuerst GmBH & CO. KG, Velbert (DE)

( * ) Notice: Subject to any disclaimer, the term of this patent is extended or adjusted under 35 U.S.C. 154(b) by 1032 days.

(21) Appl. No.: 16/959,791

(22) PCT Filed: Oct. 31, 2018

(86) PCT No.: PCT/EP2018/079840
§ 371 (c)(1),
(2) Date: Jul. 2, 2020

(87) PCT Pub. No.: WO2019/137648
PCT Pub. Date: Jul. 18, 2019

(65) Prior Publication Data
US 2020/0342701 A1 Oct. 29, 2020

(30) Foreign Application Priority Data
Jan. 15, 2018 (DE) ...................... 10 2018 100 715.9

(51) Int. Cl.
*G07C 9/00* (2020.01)
*H01M 50/193* (2021.01)
(Continued)

(52) U.S. Cl.
CPC ........... *G07C 9/00944* (2013.01); *G07C 9/00* (2013.01); *H01M 50/193* (2021.01); *H01M 50/20* (2021.01); *H01M 50/216* (2021.01)

(58) Field of Classification Search
CPC ...... G07C 9/00944; G07C 2009/00952; G07C 2009/00968; G07C 2009/00984;
(Continued)

(56) References Cited

U.S. PATENT DOCUMENTS

| | | | | |
|---|---|---|---|---|
| 8,920,963 B2* | 12/2014 | Hirano | ................. | H01H 9/0235 |
| | | | | 429/96 |
| 9,286,744 B2* | 3/2016 | Montarou | ............. | E05B 19/043 |
| 9,595,149 B2* | 3/2017 | Porada | .................. | E05B 19/046 |
| 2012/0009454 A1 | 1/2012 | Hirano et al. | | |

FOREIGN PATENT DOCUMENTS

| | | |
|---|---|---|
| CN | 2809147 Y | 8/2006 |
| CN | 203013829 U | 6/2013 |

(Continued)

OTHER PUBLICATIONS

International Preliminary Report on Patentability of of International Application No. PCT/EP2018/079840 dated Jul. 21, 2020, (with English Translation) 19 pages.
(Continued)

*Primary Examiner* — Kristina R Fulton
*Assistant Examiner* — Noah Horowitz
(74) *Attorney, Agent, or Firm* — Lippes Mathias LLP

(57) ABSTRACT

An electronic handheld device includes a housing which has at least one housing element, including an electronics arrangement and a battery compartment, which is arranged in the housing element, for accommodating a flat battery. The battery compartment terminates with an insert opening of the battery compartment being located at an access surface of the housing element, wherein a circumferential sealing groove is formed on the housing element. The insert opening is closed by a sealing hood which is arranged on a restraint element. The sealing hood has an elastically deformable raised sealing portion.

12 Claims, 6 Drawing Sheets

(51) Int. Cl.
*H01M 50/20* (2021.01)
*H01M 50/216* (2021.01)

(58) Field of Classification Search
CPC .. H01M 50/10; H01M 50/102; H01M 50/147; H01M 50/148; H01M 50/153; H01M 50/183; H01M 50/184; H01M 50/186; H01M 50/188; H01M 50/193; H01M 50/20; H01M 50/216; E05B 19/0005; E05B 19/0082; E05B 2047/0084; E05B 2047/0085; E05B 2047/0088; E05B 49/00
See application file for complete search history.

(56) References Cited

FOREIGN PATENT DOCUMENTS

| CN | 104389457 | A | | 3/2015 | |
|----|-----------|---|---|--------|---|
| CN | 102496201 | B | * | 7/2015 | ......... G07C 9/00944 |
| CN | 105074105 | A | | 11/2015 | |
| DE | 10 2006 037790 | A1 | | 9/2007 | |
| DE | 102006037790 | A1 | | 9/2007 | |
| DE | 102012107317 | A1 | * | 2/2014 | ......... G07C 9/00944 |
| EP | 1944818 | B1 | * | 10/2011 | ........... E05B 19/043 |
| EP | 2 405 407 | A2 | | 1/2012 | |
| JP | 11189268 | A | | 7/1999 | |
| JP | H11189268 | A | | 7/1999 | |

OTHER PUBLICATIONS

Anonymous. "Heißverstemmen", Mar. 21, 2017 (Mar. 21, 2017), Retrieved from the Internet: https://de.wikipedia.org/w/index.php?title=Hei%C3%9Fverstemmen&oldid=163794033 [retrieved on Jan. 22, 2019] DOI: 10.1002/latj.200890055/abstract) XP055545525 (and English Translation), 4 pages.

International Search Report of International Application No. PCT/EP2018/079840 dated Jan. 30, 2019, 6 pages.

Office Action for Chinese Patent Application No. 201880086251.2, dated Feb. 22, 2024, 8 pages.

* cited by examiner

ELECTRONIC HANDHELD DEVICE, IN PARTICULAR RADIO KEY, WITH A SEALING HOOD

BACKGROUND

The invention relates to an electronic handheld device, in particular a portable handheld device, which is set up for radio communication.

Electronic handheld devices are known from practice.

An example of an area in which electronic handheld devices are used in large numbers is electronic locking systems of vehicles. The functionality of modern electronic locking systems of vehicles is based on radio communication between a control unit on the motor vehicle and an electronic handheld device formed as a radio key. In the context of radio communication, an access authorization of the owner of the radio key is checked, usually using cryptographic methods. The range of specific embodiments of radio keys is broad and includes, for example, radio keys for use with locking systems, which are often referred to as keyless locking systems.

For the functionality of the handheld devices, for example the radio key, a battery for the electrical power supply of the electronic components providing the functionality is generally used in these.

Due to the regular and often incidental use of electronic handheld devices by an operator, electronic handheld devices, such as radio keys, are often kept in clothing worn on the body. An example of this is the storage of a radio key in a pocket. If an electronic handheld device is stored in a piece of clothing, there is a risk of inadvertently supplying it to laundry washing along with the clothes.

Against the background of the scenario explained above, there is a desire to provide electronic handheld devices that have a high degree of water resistance. The invention described below has been developed on the basis of this object.

BRIEF SUMMARY

The object is achieved with an electronic handheld device with the features of claim 1.

An electronic handheld device is provided which has a housing with at least one housing element. The electronic handheld device also has an electronics arrangement, for example a circuit board and electronic components arranged on the circuit board, and a battery compartment for accommodating a flat battery for the electrical power supply of the electronics arrangement or the electronic components arranged on the electronics arrangement. The battery compartment is connected to the housing element or is formed at least partially, preferably completely, as an integral part of the housing element. The battery compartment can be formed, for example, as a trough molded into the housing element.

The housing element can be made of a thermoplastic, for example.

The housing element has an access surface from which the battery is accessible. For the removal of a battery present in the battery compartment or for the insertion of a battery into the battery compartment, the battery compartment has an insert opening which terminates preferably flush with the access surface.

For example, the access surface can be provided as a flat or at least partially flat surface which delimits the battery compartment formed as a trough, so that the opening of the trough is the insert opening of the battery compartment. The access surface is preferably oriented flush with or parallel to an end face of a flat battery used in the battery compartment. A flat battery can be inserted through the insert opening in the battery compartment or removed from the battery compartment.

A circumferential sealing groove is formed on the access surface of the housing element. This sealing groove completely runs around the insert opening. The sealing groove thus follows a closed course and can for example be annular. The sealing groove preferably has two lateral boundary surfaces which are oriented perpendicular to the access surface.

A sealing hood is arranged on the housing element. The sealing hood closes the insert opening in order to close the insert opening in a liquid-sealing manner. The property of the liquid sealing is to be understood in such a way that an entry of water originating from atmospheric moisture into the insert opening, in a manner impairing the functionality of the handheld device during the normal use in the course of a typical service life of the handheld device, can be ruled out. Depending on the design of the handheld device by a person skilled in the art, this can also withstand, for example, brief, heavy liquid loads without negative effects on the functionality.

The insert opening can be opened and closed again. This means in particular and at least that the sealing hood can be removed from the insert opening for a battery change without being destroyed and can be brought back to the original closed state after the battery change. In particular, the sealing hood is not integrally connected to the housing element.

For a reliable arrangement of the sealing hood on the housing element and for reversible sealing of the insert opening, the sealing hood is provided with an elastic raised sealing portion.

The elastic raised sealing portion is arranged on a sealing surface of the sealing hood. The sealing surface is the surface of the sealing hood that faces the access surface, preferably at least in sections, on the access surface. The raised sealing portion is formed complementary to the sealing groove. The complementary configuration of the raised sealing portion to the sealing groove is to be understood to mean that the shape and positioning of the raised sealing portion are selected such that the raised sealing portion is located within the sealing groove when the insert opening is closed. The raised sealing portion preferably has a closed course and completely encompasses the insert opening.

The raised sealing portion is formed in such a way that the raised sealing portion has an excess in relation to the sealing groove in a radial direction of the sealing groove. A radial direction is a direction which is oriented perpendicular to a surface normal of the insert opening, in a preferred special case is oriented perpendicular to a surface normal of an end face of the flat battery.

The term "excess" refers to the uncompressed state of the raised sealing portion. The raised sealing portion thus has an excess outside the sealing groove, which is formed within the sealing groove by the boundaries of the sealing groove in the boundaries of the sealing groove.

In the case of a circular cylindrical flat battery, a radial direction is a direction which is oriented perpendicular to the axis of rotation of the circular cylindrical flat battery.

The flat battery is preferably circular-cylindrical and encompassed by a sealing groove, the boundary edges of which follow a circular course on the access surface. The lateral boundary surfaces of the sealing groove are particularly preferably encompassed perpendicular to the access surface and coaxially with the axis of rotation of the flat battery inserted in the battery compartment.

Since the raised sealing portion in the radial direction of the sealing groove according to the invention has the excess compared to the sealing groove, the raised sealing portion within the sealing groove is elastically deformed in the radial direction by the sealing groove. As a result of the elastic deformation of the sealing groove, restoring forces are brought about. The radially acting restoring forces bring about a sealing effect, so that a good seal of the battery compartment is brought about against the exterior of the battery compartment, for example against liquids.

The term "elastically deformable raised sealing portion" is to be understood in such a way that the raised sealing portion is formed in coordination with the sealing groove, that the raised sealing portion is deformed by the sealing groove and in the deformed state, due to the elasticity, provides sufficient restoring forces to provide the sealing effect. A corresponding choice of material and definition of a specific geometry is to be made by the person skilled in the art depending on the requirements imposed on him, for example with regard to the desired sealing, and easily possible for him, for example empirically.

For example, a radial extension of the excess of the raised sealing portion in the radial direction can be between 5 and 50 percent, preferably between 10 and 20 percent, of the radial extension of the sealing groove.

In a preferred embodiment, the raised sealing portion has an excess relative to the sealing groove along the entire course around the insert opening, so that the sealing effect brought about by elastic deformation is provided all around the battery compartment.

The desired sealing of the battery compartment against liquids is thus achieved by completely closing the insert opening through which the battery can be inserted or removed. The connection of the sealing hood provided for closing with the housing element, which has the battery compartment, is brought about or at least supported by the frictional connection between the raised sealing portion of the sealing hood and the sealing groove of the housing element. The frictional connection is brought about or at least strengthened by the elastic deformation of the raised sealing portion taking place in the radial direction. Due to the elastic deformation, the raised sealing portion generates restoring forces which exert a radial force on the inner walls of the sealing groove and thereby bring about or at least improve the desired sealing effect.

It is not excluded that, in addition to the radially elastic deformation and the resulting sealing effect, axial deformations and/or connections provided in the axial direction are also provided, for example by corresponding undercuts in the sealing groove. Such considerations can be implemented within the scope of special embodiments of the invention.

The elastic configuration of the raised sealing portion can include configurations in which the raised sealing portion is only elastic in sections. It is substantial that the raised sealing portion, when introduced into the sealing groove, is subject to such elastic deformations that restoring forces acting on the side walls of the sealing groove are brought about in the radial direction. However, the entire volume of the raised sealing portion preferably consists of elastic material. An integral design of the sealing hood including the raised sealing portion made of the same elastic material is particularly preferred.

The excess of the raised sealing portion in a radial direction results in a comparatively elegant and easy-to-use arrangement of the sealing hood on the housing element. The fixation and the sealing take place with the sealing element, whereby separate further elements or formations for example undercuts in the groove or the like, are not absolutely necessary. There are therefore only two forms, namely the raised sealing portion and the sealing groove, which are substantial for bringing about the intended functionality, one of the two being formed to be elastic with the sealing element. From these framework conditions it follows that the tolerances to be observed can be provided very generously, which results in an easy and correspondingly inexpensive production of the sealing hood and the housing element. A particularly good use of the tolerance chain is achieved if the sealing hood is provided as an integral molded component, as is preferred.

When removing the sealing hood from the housing element and thus removing the raised sealing portion from the sealing groove, it is desirable that an inadvertent loss of the sealing hood can be largely reliably avoided. For this reason, the housing element has a restraint element which is arranged adjacent to both the access surface and the insert opening. The restraint element has a mushroom head and a column portion tapered relative to the mushroom head. The mushroom head is a portion of the restraint element which is spaced apart from the access surface and which has greater extensions in the radial direction than the column portion arranged directly on the access surface.

In cooperation with the column portion, an undercut is provided by the mushroom head. The undercut is used for the axial positioning of the sealing hood. The sealing hood is arranged on the restraint element with a fastening tongue. The fastening tongue is adapted to the positioning and shape of the restraint element and is made of an elastic material.

The fastening tongue has a fastening hole. The fastening hole comprises the column portion for fastening the sealing hood to the handheld device. The fastening hole lies so closely, preferably flush, on the tapered column portion that the provided undercut limits the mobility of the sealing hood in an axial direction. Preferably, an axial extension of the tapered column portion and a thickness of the fastening tongue in the region of the fastening tongue adjoining the fastening hole are the same, that is to say with an at most slight deviation in thickness in the range of, for example, at most 5 percent of the axial extension of the tapered column portion.

Because the fastening tongue is formed to be elastic, the sealing hood is fastened to the restraint element by means of elastic deformation of the fastening tongue in the region of the fastening hole and subsequent covering over the mushroom head when the handheld device is mounted for the first time. Of course, the dimensions of the mushroom head and the material selection of the sealing hood, at least in the area of the fastening tongue, must be selected accordingly by a person skilled in the art.

Because the sealing hood is fixed to the housing element with the fastening tongue, the introduction of the raised sealing portion into the sealing groove, for example after a battery change, is significantly facilitated.

In a special embodiment of the handheld device, the restraint element can be formed as a hot caulked dome. This embodiment has the advantage in the production of the handheld device that the dome and the fastening hole of the fastening tongue can be adapted to one another, for example can have the same radius, and after inserting the dome into the fastening hole and arranging the sealing hood by means of hot caulking the sealing hood is attached to the handheld device with a precise fit.

According to an advantageous development of the invention, a cylindrical guide member is arranged on the housing element and is positioned in the vicinity of the insert opening and the restraint element. In this embodiment, the fastening tongue has a guide opening which is complementary to the guide member. The guide opening and the guide member are positioned and shaped relative to one another such that the guide member is encompassed by the guide opening and thus the guide member contributes to the positioning of the sealing hood against rotation of the sealing hood in a sealing hood plane. Because there are two coupling points of the sealing hood on the handheld device with the guide member and the restraint element, an even easier handling of the sealing hood is achieved for the operator in the context of a battery change.

In order to prevent or at least reduce the occurrence of mechanical stresses within the sealing hood, according to an advantageous embodiment the sealing hood has a bellows which is arranged between the elastic fastening tongue and the raised sealing portion. The bellows serves as a material reserve for the fastening tongue in order to, at least partially, absorb stresses arising outside of the bellows due to elastic deformations and thereby reduce wear on the sealing hood or negative impairments of the sealing.

Another development of the handheld device provides a lateral decorative element of the housing element, which is connected to the housing element. According to this configuration, the sealing hood is arranged between the lateral decorative element and a lateral surface of the housing element. To arrange the sealing hood between the lateral decorative element and the housing element, the sealing hood has a clamping tab which comprises a restraint opening. The clamping tab rests on a lateral surface of the housing element and is arranged with its restraint opening around a restraint projection. The restraint projection is preferably an integral part of the housing element.

An embodiment is particularly preferred in which the clamping tab rests on the housing element with a first surface and on the lateral decorative element with a second surface. A clamping tab arranged between the housing element and the lateral decorative element, which is generally to be positioned accordingly during the initial assembly of the handheld device, leads on the one hand to an optically elegant fixation and on the other hand to a secure and firm hold of the sealing hood on the handheld device.

It is particularly preferred if a radial extension of the raised sealing portion along the entire circumference of the raised sealing portion has an excess compared to a radial distance of the boundary surfaces which delimit the sealing groove. In other words, since the excess relates to the uncompressed state of the raised sealing portion, this means that the raised sealing portion is preferably radially compressed along the entire circumference of the raised sealing portion by the lateral boundary surfaces of the sealing groove. This results in a radial restoring force along the entire circumference of the raised sealing portion, which results in a particularly good sealing effect.

It is preferred if the sealing groove has coaxial boundary surfaces along its entire axial extent, so that the boundary surfaces of the sealing groove are oriented perpendicularly in a radial direction for all straight lines perpendicular to an axis of symmetry of the circular cylindrical flat battery. Such an embodiment is particularly elegant and, due to its high symmetry, has a good distribution of forces in the radially compressed raised sealing portion.

The sealing groove and the raised sealing portion therefore preferably each have a circular course.

The raised sealing portion preferably has an elastomer, wherein elastomeric silicones are particularly suitable and therefore particularly preferred. A particularly elegant embodiment of the sealing hood provides that the raised sealing portion consists exclusively of the elastomer, the entire sealing hood being particularly preferably provided as an integral elastic element, preferably formed from an elastomeric silicone.

As already mentioned at the beginning, a preferred use for the handheld devices described is in handheld devices formed as radio keys of a vehicle. The term "radio key" is to be understood broadly, in particular it should also include ID transmitters for keyless entry locking systems, regardless of whether the ID transmitter also includes mechanical opening means, in particular a key blade.

Further details, features, and advantages of the object of the invention will become apparent from the following description in conjunction with the drawings. Exemplary embodiments of the invention are shown in the drawings.

It goes without saying that the features mentioned above and the features explained below can be used not only in the respectively specified combination, but also in other combinations or on their own.

DETAILED DESCRIPTION

Figure 1A:
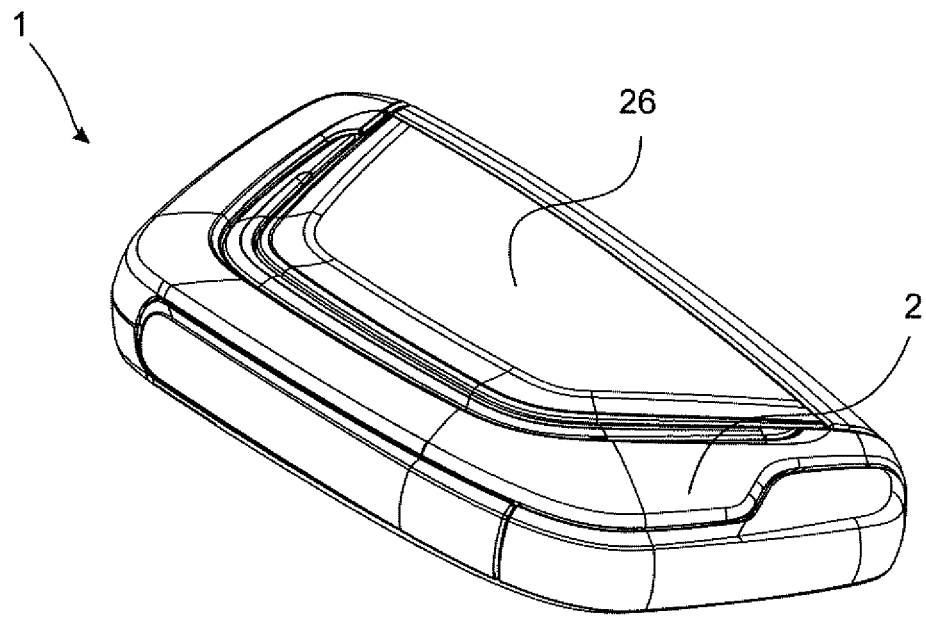
FIG. 1a: configuration of an electronic handheld device according to the invention formed as a radio key for a vehicle in a perspective oblique view.

FIG. 1a shows an electronic handheld device 1 according to the invention formed as a radio key of a vehicle. The handheld device 1 has, among other things, a housing element 2 and a foldable closure cap 26.

Figure 1B:
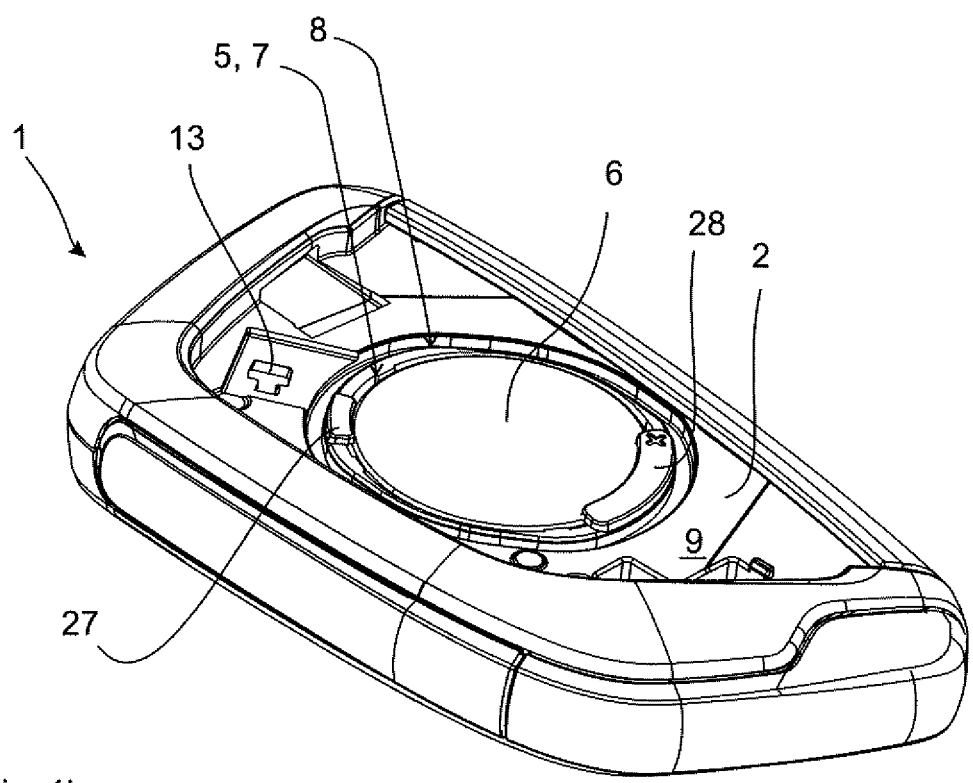
FIG. 1b; radio key of FIG. 1a with the closure cap removed and without a sealing hood.

After the closure cap 26 has been folded away, the interior of the radio key 1 becomes accessible, in particular for a battery change. The interior of the radio key 1 in the embodiment in FIG. 1a is shown in FIG. 1b, wherein the closure cap is not shown. It can be seen that the radio key 1 has a housing element 2. In the embodiment shown, the housing element 2 serves as a supporting framework for the radio key 1 and as a physical separation between the electronics arrangement, which in the embodiment shown is arranged below the housing element and is therefore covered by it. The housing element 2 has an access surface 9, from which a battery compartment 5 is formed into the radio key interior. In the embodiment shown, the battery compartment 5 is formed as a trough, which terminates with an insert opening 7 that is flush with the access surface 9.

A flat battery 6 is arranged in the battery compartment 5 and held in position by means of retaining catches 27, 28. The flat battery 6 can be removed through the insert opening 7, for example for a battery change. Starting from the access surface 9, a sealing groove 8 is formed into the housing element 2, which encompasses the insert opening 7 and thus also the flat battery 6 once concentrically and following a circular course. As an alternative to the preferred concentric circular course, other courses of the sealing groove 8 are also conceivable.

Arranged on the housing element is a restraint element 13 which is formed as a restraint mushroom, namely has a mushroom head, which is fastened on a column portion tapered relative to the mushroom head.

Figure 2:
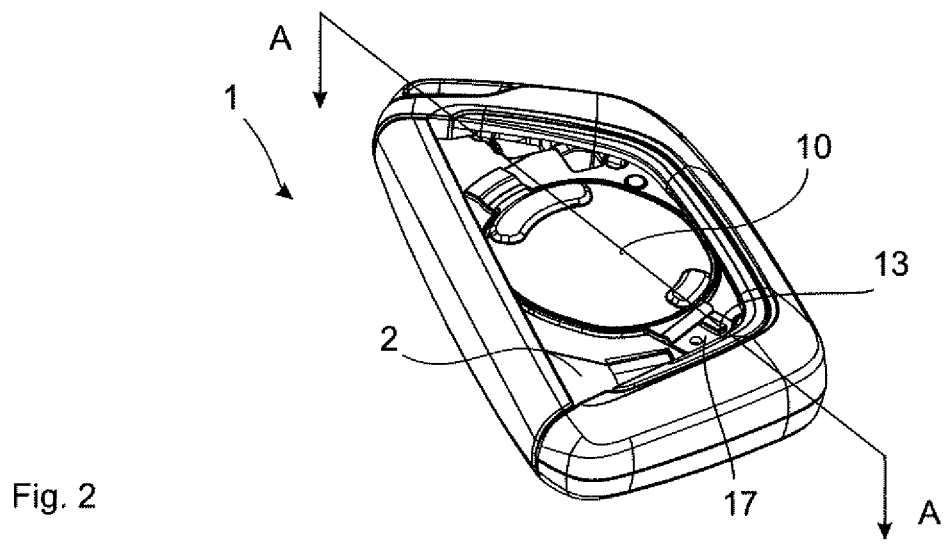
FIG. 2: illustration of FIG. 1b with added sealing hood.

The radio key 1 of FIG. 1b is shown in FIG. 2, but rotated in a perspective orientation by approximately 180 degrees. The illustration in FIG. 2 shows a sealing hood 10 closing the insert opening 7. The sealing hood 10 covers, among other things, the flat battery 6 and seals it from the external environment in a liquid-sealing manner. To fasten the sealing hood 10 to the housing element 2 formed as a housing half-shell, an elastic fastening tongue 17 of the sealing hood 10 is positioned around the column portion of the restraint element 13 with a fastening hole of the fastening tongue 17. A cross section of the fastening hole arranged in the fastening tongue 17 is adapted to the column portion 15 and the mushroom head 14 such that an unintentional separation of the fastening tongue 17 arranged on the restraint element 13 from the housing element 2 can largely be ruled out.

Figure 3A:
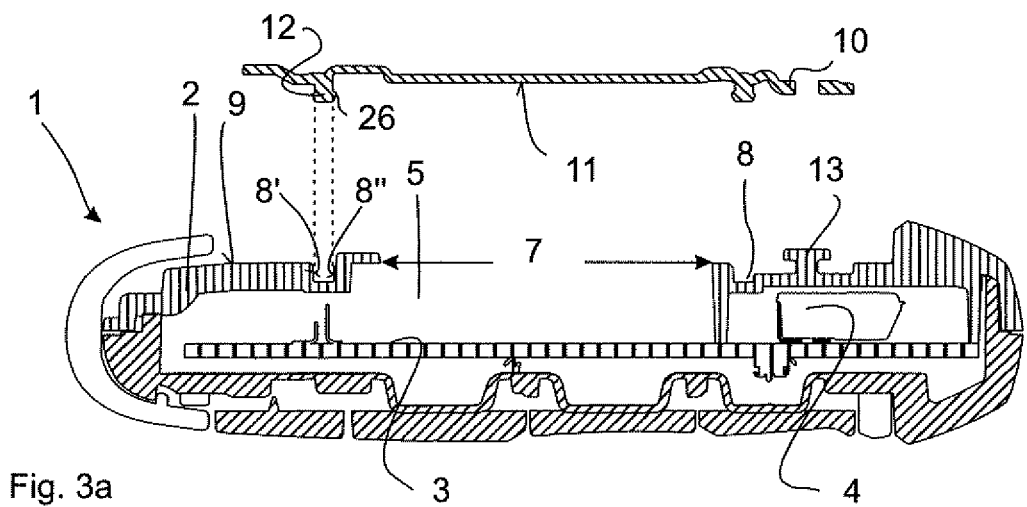
FIG. 3a: sectional view of the radio key of FIG. 2 according to section plane A-A.

The cross section of FIG. 3a shows how the insert opening 7 is sealed by means of the sealing hood 10. In the embodiment shown, the sealing hood 10 is formed as an integral elastic element which consists of an elastomeric silicone, also referred to as a silicone elastomer. The sealing hood 10 has a raised sealing portion 12 on that surface of its two surfaces which faces the battery compartment 5 and which is referred to as the sealing surface 11.

The raised sealing portion 12 is complementary to the sealing groove 8, which is to be understood in such a way that the positioning and shaping of the raised sealing portion 12 and sealing groove 8 are carried out in such a way that the raised sealing portion 12 can be inserted into the sealing groove 8. In a radial direction of the sealing groove 8, which is oriented perpendicular to the axis of rotation of the sealing groove 8 in the embodiment shown and also perpendicular to a plane normal of the sealing surface in the special embodiment, the raised sealing portion 12 has an excess compared to the sealing groove 8. This means that a distance between the outer boundary surface 8' of the sealing groove 8 and the inner boundary surface 8" of the sealing groove 8 is less than a radial extension of the raised sealing portion 12 at a portion provided for insertion between the boundary surfaces 8', 8" in the not introduced state of the raised sealing portion 12. In the embodiment shown, the greater axial extent of the raised sealing portion 12 is provided by the sealing bead 26, which in the embodiment shown and in all preferred embodiments runs along the entire circumference of the sealing groove 8.

Figure 3B:
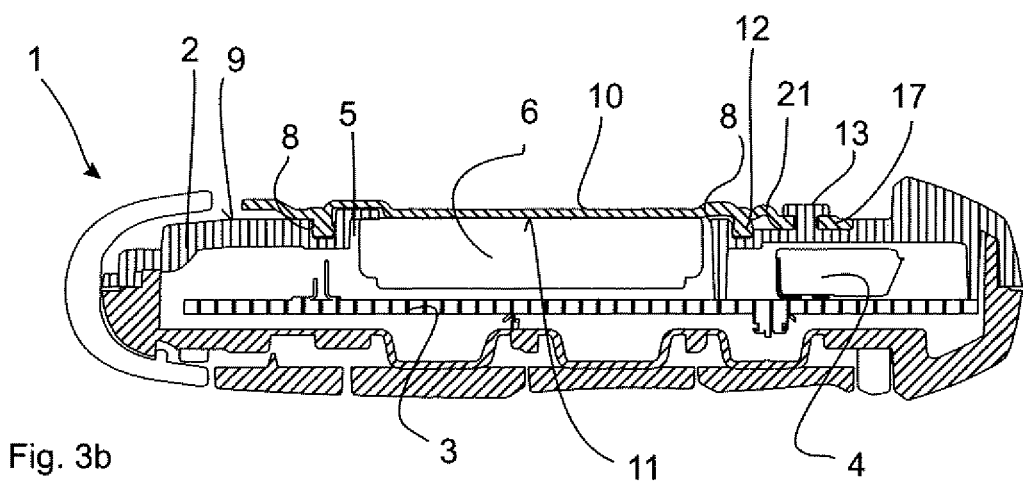
FIG. 3b: section according to FIG. 3a, but with the arranged sealing hood.

When the raised sealing portion 12 is arranged in the sealing groove 8, the raised sealing portion 12 is elastically deformed in the radial direction, as shown in FIG. 3b. Because the excess in the embodiment shown is present along the entire circumference of the raised sealing portion 12, the elastic deformation in the radial direction likewise takes place along the entire circumferential course of the raised sealing portion 12. Due to the elastic deformation of the raised sealing portion 12 in the radial direction, restoring forces are provided, which provide a high seal of the battery compartment 5 against the ingress of liquids present in the exterior. To fasten the sealing hood 10 to the housing element 2, the fastening tongue 17, with a fastening hole made in the fastening tongue 17, was slipped over the mushroom head of the restraint element 13, so that the positioning of the clamping tab in the axial direction and the arrangement of the sealing hood 10 on the handheld device 1 is protected against accidental detaching. In order to avoid the introduction of mechanical stresses in the sealing hood 10 with potentially disadvantageous properties, inter alia, for the sealing effect when the sealing hood 10 is attached to the restraint element 13, a bellows 21 is arranged between the fastening tongue 17 and the raised sealing portion 12, which bellows serves as a material buffer as a result of a curvature molded into the elastic material. In the illustration shown, the sealing effect and the visual appearance of the sealing hood 10 arranged on the radio key 1 are further improved in that the sealing surface 11 is arranged in areas lying on the access surface 9. The cuts of FIGS. 3a and 3b also show the positioning of a circuit board 3 and a microprocessor 4 arranged on the circuit board 3, which together form part of the electronics arrangement 3, 4.

Figure 4:
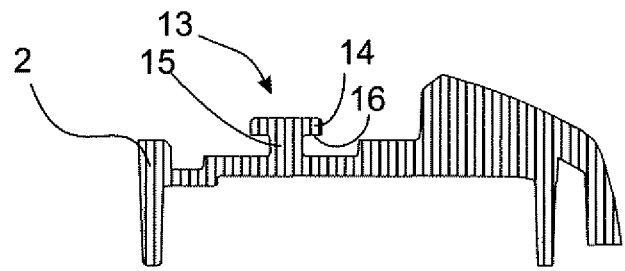
FIG. 4: section from FIG. 3b.

FIG. 4 shows a part of the section from FIG. 3b, namely the section through a part of the housing shown in the upper right area in FIG. 3b. It can be seen that the restraint element 13 is integrally formed with the housing element 2, which preferably consists of a thermoplastic. The restraint element 13 consists of a column portion 15 and a mushroom head 14 which, in the embodiment shown, extends in every radial direction beyond the extension of the column portion tapered relative to the mushroom head. As a result, an undercut 16 is provided, which after arrangement of the fastening tongue 17 with the fastening hole 18 acts around the column portion 15 for the axial positioning of the fastening tongue, not shown in FIG. 4.

Figure 5:
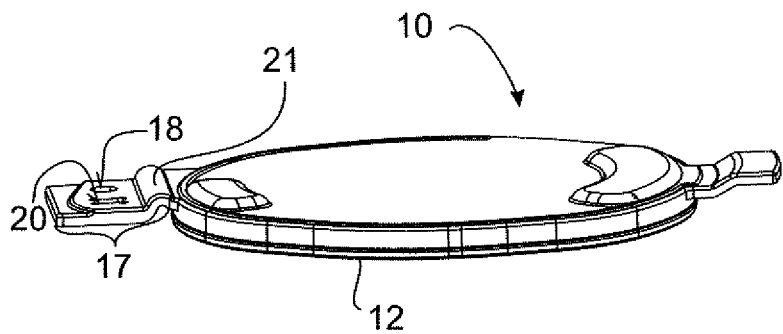
FIG. 5: sealing hood from the radio key of FIG. 2 in an individual perspective view.

FIG. 5 shows the sealing hood 10 in a perspective illustration. In particular, the fastening tongue 17 and the fastening hole 18 can be seen. Furthermore, the curvature deformation of the fastening tongue 17, which is arranged between the fastening tongue 17 and the raised sealing portion 12, can be seen, which forms the bellows 21 and is provided in particular for an at least partial compensation of dimensional deviations. Furthermore, a guide opening 20 is arranged in the fastening tongue 17. The guide opening 20 serves for the introduction into a guide member 19 complementary to the guide opening 20 for positioning the sealing hood 10 against twisting around the restraint element 13 inserted into the fastening hole 18.

Figure 6:
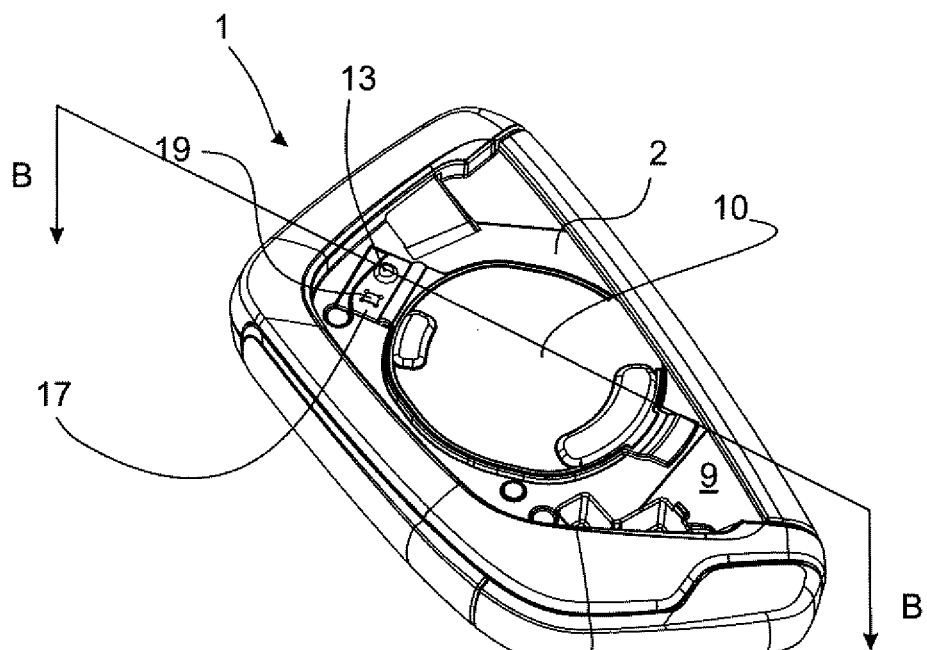
FIG. 6: another embodiment of a radio key in an illustration without a closure cap.

FIG. 6 shows a further embodiment of a radio key 1. In contrast to the embodiment shown in FIGS. 1 to 5, the embodiment shown in FIG. 6 has a specially shaped restraint element 13. The restraint element 13 shown in FIG. 6, in contrast to the restraint element 13 shown in the embodiment of FIGS. 1 to 5, is not a mushroom head that is integrally formed with the housing element 2; instead, the restraint element 13 in the embodiment shown in FIG. 6 is a hot caulked dome. The hot caulked dome 13 provides a functionality similar to that already explained for the restraint element 13 in the embodiment of FIGS. 1 to 5; however, the hot caulked dome has the advantage in the course of production that the dome is hot caulked after the dome has been inserted into the fastening hole, and it is therefore not necessary to stretch the fastening tongue 17 when it is arranged around the dome. The design of the restraint element 13 as a hot caulked dome is therefore particularly suitable for embodiments in which the sealing hood 10 is made of a material with a comparatively low extensibility.

Figure 7:
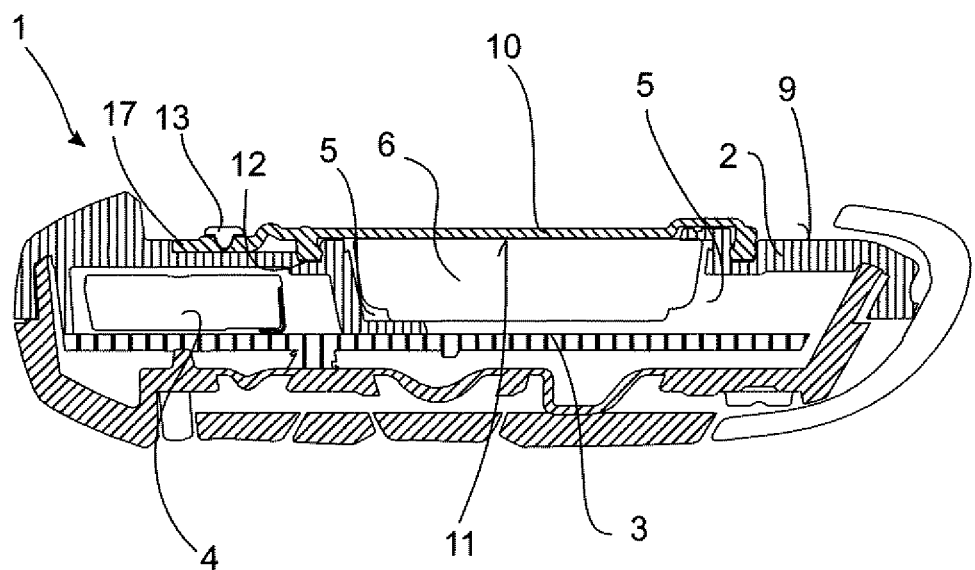
FIG. 7: sectional view of the radio key of FIG. 6 according to section plane B-B.

FIG. 7 is a sectional view of the radio key of FIG. 6; this can be seen in particular how the hot caulked dome 13 ensures an arrangement of the head of the restraint element 13 which lies well against the fastening tongue 17 and thus ensures a good axial positioning of the sealing hood 10 on the housing element 2.

Figure 8:
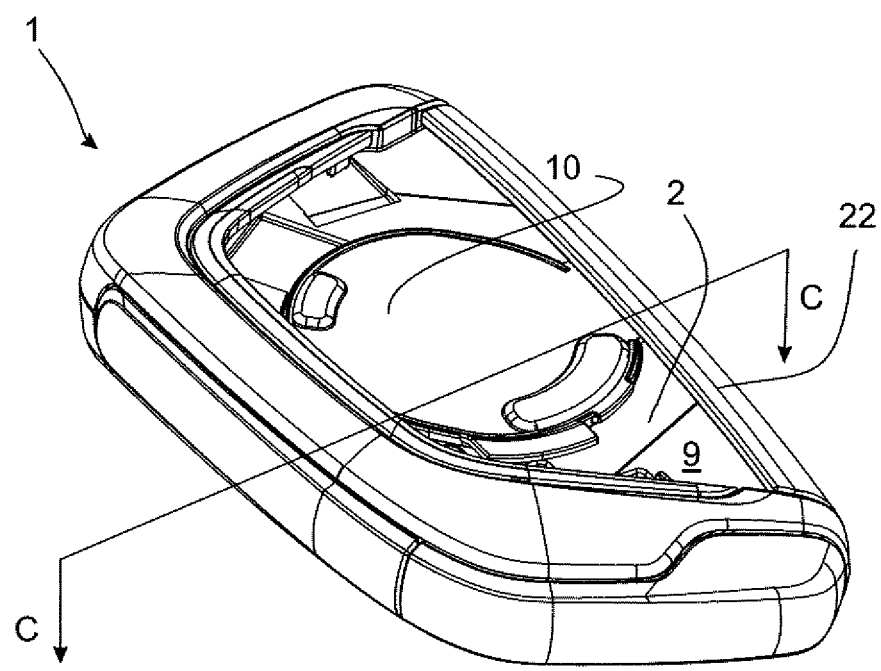
FIG. 8: a further exemplary embodiment of a radio key as an example of a handheld device according to the invention in an illustration without a closure cap.
Figure 9:
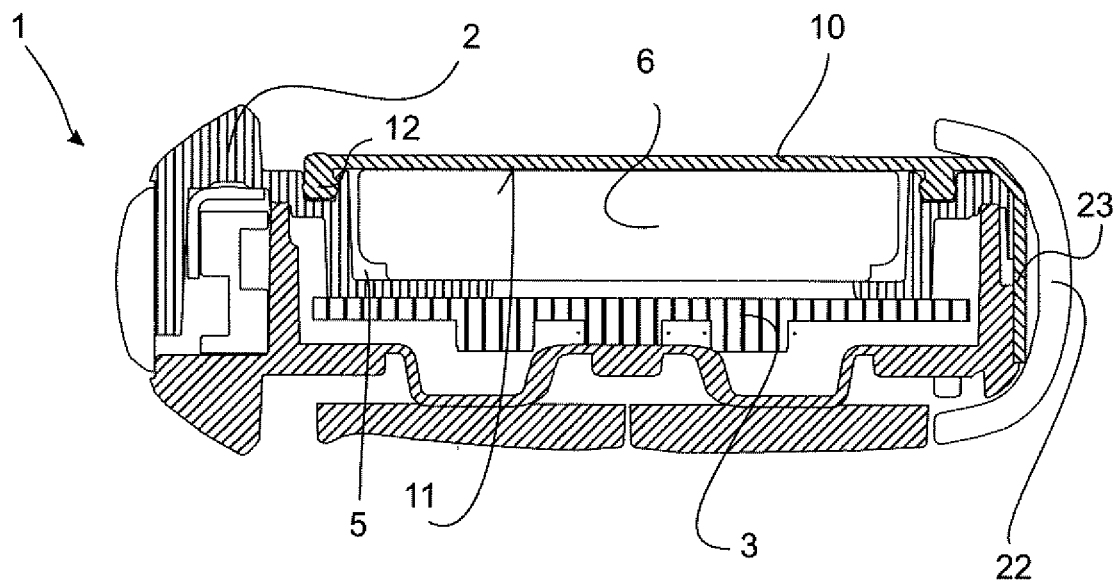
FIG. 9: sectional illustration of the radio key of FIG. 8 in an illustration along the sectional plane C-C.
Figure 10:
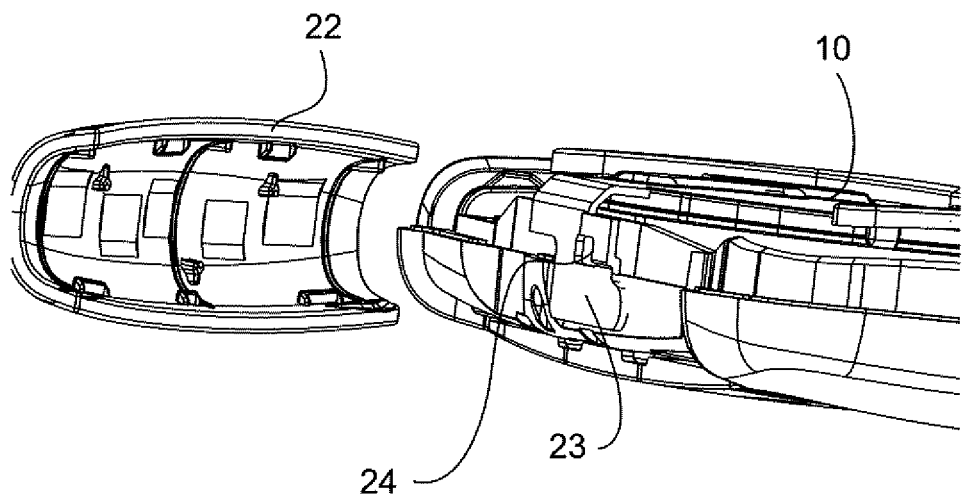
FIG. 10: perspective side view of the radio key of FIG. 8 having the lateral decorative element removed.
Figure 11:
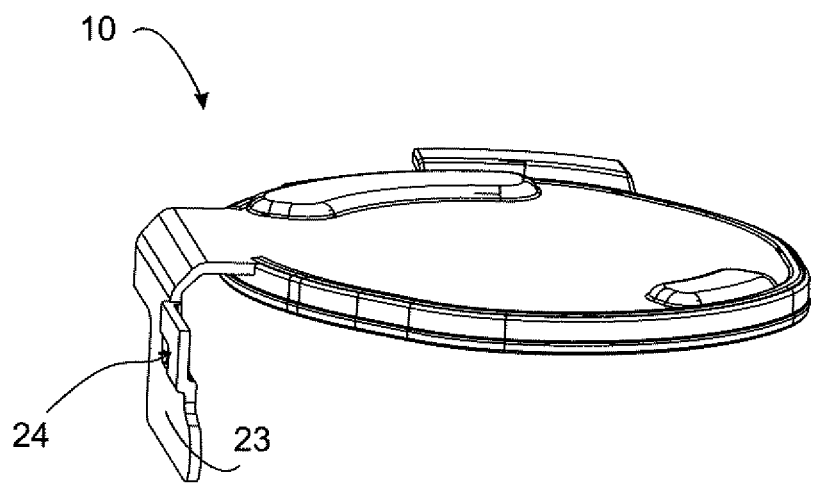
FIG. 11: sealing hood of the radio key of FIG. 8 in a perspective side view.
Figure 12:
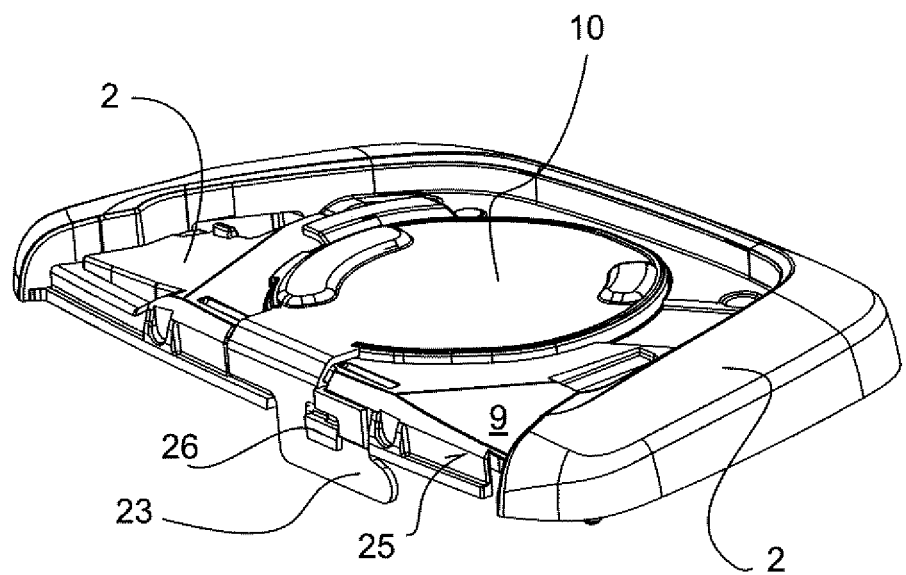
FIG. 12: detailed perspective view of the sealing hood of the radio key of FIG. 8 in the position arranged on the housing element.

The embodiment of the radio key 1 shown in FIG. 8 differs from that in FIGS. 1 to 5 and from that in FIGS. 6 and 7, in particular in that the sealing hood 10 has a clamping tab which engages into a restraint projection with a restraint opening on a lateral surface of the housing element 2. The mode of operation is shown in the sectional view of FIG. 9. It can be seen how the clamping tab 23 is guided downwards against the side of the housing element 2 and, as a result of the attachment of the lateral decorative element between the lateral decorative element and the housing element 2, is arranged so as to lie against the housing element 2. As can be seen in FIG. 10, the restraint opening 24 is provided, which is positively fixed in the manner shown in FIG. 12 by a restraint projection 26 of the housing element 2, which engages in the restraint opening 24. After the lateral decorative element 22 has been put in place, the clamping tab 23 is largely hidden from the outside, as can be seen in the illustration in FIG. 8; the design of the clamping tab and its arrangement between the housing element and the lateral decorative element thus leads to a particularly aesthetic design of the radio key 1.

The invention claimed is:

1. An electronic handheld device comprising a housing which has at least one housing element, comprising an electronics arrangement and comprising a battery compartment, which is arranged in the housing element, for accommodating a flat battery for an electrical power supply of the electronics arrangement,
   wherein the battery compartment terminates with an insert opening of the battery compartment at an access surface of the housing element to remove or insert the flat battery during a battery change,
   wherein a circumferential sealing groove is formed on the access surface of the housing element, wherein the circumferential sealing groove completely encompasses the insert opening,
   wherein the insert opening is closed by a sealing hood arranged on the housing element in an openable and reclosable manner to seal the battery compartment against liquid entering the battery compartment,
   wherein the sealing hood has an elastically deformable raised sealing portion on a sealing surface facing the access surface,
   wherein the raised sealing portion is complementary formed to the sealing groove and is introduced within the sealing groove,
   wherein the raised sealing portion is larger than the sealing groove in a radial direction of the sealing groove such that the raised sealing portion within the sealing groove is elastically deformed in the radial direction by the sealing groove to cause a sealing effect by means of restoring forces caused by the radially elastic deformation of the sealing groove,
   wherein the housing has a lateral decorative element which is connected to the housing element,
   wherein the sealing hood has a clamping tab with a restraint opening,
   wherein the clamping tab is arranged abutting a lateral surface of the housing element and surrounding a restraint projection with the restraint opening being located between the housing element and the lateral decorative element and abutting both,
   wherein the restraint projection extends completely through the restraint opening, and wherein the lateral decorative element is to be positioned during the initial assembly of the handheld device on the side surface of the handheld device on which also the restraint opening and the restraint projection are present in order to fix the clamping tab radially with the restraint opening completely surrounding the restraint projection.

2. The electronic handheld device according to claim 1, wherein the housing element has a restraint element which is arranged adjacent to the access surface and the insert opening, wherein the restraint element has a mushroom head and has a column portion which is tapered relative to the mushroom head to provide an undercut,
   wherein the sealing hood has an elastic fastening tongue with a fastening hole, wherein the fastening hole comprises the column portion such that the sealing hood is positioned in an axial direction by means of the undercut.

3. The electronic handheld device according to claim 2, wherein the restraint element is a hot caulked dome.

4. The electronic handheld device according to claim 2, wherein the housing element has a cylindrical guide member which is arranged on the access surface and adjacent to both the insert opening and the restraint element,
   wherein the fastening tongue has a guide opening which is complementary to the guide member and comprises the guide member for positioning the sealing hood against rotation about the restraint element in a sealing hood plane.

5. The electronic handheld device according to claim 2, wherein the sealing hood has a bellows formed between the elastic fastening tongue and the raised sealing portion for absorbing mechanical stresses within the sealing hood.

6. The electronic handheld device according to claim 1, wherein a radial extension of the raised sealing portion is larger than the entire circumference of the raised sealing portion compared to a radial distance of the boundary surfaces delimiting the sealing groove in an axial portion of the sealing groove provided for arranging the raised sealing portion if the raised sealing portion is not arranged in the sealing groove.

7. The electronic device according to claim 1, wherein the sealing groove has coaxial boundary surfaces along its entire axial extent.

8. The electronic handheld device according to claim 1, wherein the sealing groove and the raised sealing portion each execute a circular course.

9. The electronic handheld device according to claim 1, wherein the raised sealing portion has an elastomer.

10. The electronic handheld device according to claim 1, wherein the sealing hood is an integral elastic element.

11. The electronic handheld device according to claim 1, wherein the electronic handheld device is a radio key of a vehicle.

12. The electronic handheld device according to claim 9, wherein the elastomer is an elastomeric silicone.

* * * * *